(12) United States Patent
Palomares Rentero et al.

(10) Patent No.: US 11,867,158 B2
(45) Date of Patent: Jan. 9, 2024

(54) BACK-UP POWER SUPPLY FOR WIND TURBINES

(71) Applicant: General Electric Renovables Espana, S.L., Barcelona (ES)

(72) Inventors: Pedro Palomares Rentero, Olesa de Montserrat (ES); Alio Medina Diaz, Barcelona (ES); Victor Manuel García Molina, Coslada (ES); Xavier Santacruz Rodriguez, Sabadell (ES)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/730,663

(22) Filed: Apr. 27, 2022

(65) Prior Publication Data

US 2022/0349382 A1 Nov. 3, 2022

(30) Foreign Application Priority Data

Apr. 28, 2021 (EP) .................................. 21382372

(51) Int. Cl.
| | |
|---|---|
| *F03D 9/25* | (2016.01) |
| *F03D 13/20* | (2016.01) |
| *F03D 80/80* | (2016.01) |
| *H02K 7/18* | (2006.01) |
| *F03D 1/04* | (2006.01) |

(52) U.S. Cl.
CPC ................ *F03D 9/25* (2016.05); *F03D 1/04* (2013.01); *F03D 13/20* (2016.05); *F03D 80/82* (2016.05); *H02K 7/1838* (2013.01); *F05B 2220/706* (2013.01); *F05B 2240/133* (2013.01); *F05B 2240/14* (2013.01); *F05B 2240/912* (2013.01)

(58) Field of Classification Search
CPC ..... F03D 9/25; F03D 9/30; F03D 9/34; F03D 9/43; F03D 13/20; F03D 80/80; F03D 80/82; F03D 1/04; H02K 7/1838; F05B 2240/133; F05B 2240/14; F05B 2220/50
See application file for complete search history.

(56) References Cited

U.S. PATENT DOCUMENTS

2006/0290140 A1  12/2006  Yoshida
2007/0063098 A1* 3/2007  Dionne .................. B64D 33/08
244/57

(Continued)

FOREIGN PATENT DOCUMENTS

| JP | 2008309122 A | 12/2008 |
| KR | 20150045188 A | 4/2015 |

OTHER PUBLICATIONS

Machine translation of KR 20150045188 (Year: 2015).*
European Search Report Corresponding to EP21382372 dated Sep. 30, 2021.

*Primary Examiner* — Tulsidas C Patel
*Assistant Examiner* — Thomas K Quigley
(74) *Attorney, Agent, or Firm* — Dority & Manning, P.A.

(57) ABSTRACT

The present disclosure relates to wind turbines comprising a tower, a nacelle mounted on the tower, a wind turbine rotor with a plurality of blades, and a wind turbine generator operatively coupled with the wind turbine rotor. The wind turbine further comprise one or more auxiliary wind energy converters arranged with the nacelle. The present disclosure further relates to methods for providing power to an auxiliary system of a wind turbine.

20 Claims, 5 Drawing Sheets

(56) References Cited

U.S. PATENT DOCUMENTS

| | | | |
|---|---|---|---|
| 2007/0222223 A1* | 9/2007 | Bagepalli | H02K 9/02 290/55 |
| 2008/0247875 A1* | 10/2008 | Yoshida | F03D 80/60 416/95 |
| 2010/0066088 A1* | 3/2010 | Matsushita | F03D 80/60 290/55 |
| 2010/0133824 A1* | 6/2010 | Gao | F03D 13/20 290/44 |
| 2010/0140952 A1* | 6/2010 | Jansen | H02K 9/14 290/55 |
| 2011/0204652 A1* | 8/2011 | Sato | F03D 80/60 290/1 B |
| 2012/0025541 A1* | 2/2012 | Hirai | F03D 80/60 290/55 |
| 2012/0032448 A1* | 2/2012 | Sato | F03D 80/60 290/1 B |
| 2012/0211991 A1* | 8/2012 | Hayashi | F03D 80/60 290/55 |
| 2012/0308383 A1* | 12/2012 | Sabhapathy | F03D 80/60 416/1 |
| 2013/0009405 A1* | 1/2013 | Sato | F03D 9/25 290/55 |
| 2015/0091307 A1* | 4/2015 | Funabashi | F03D 1/00 290/55 |
| 2015/0108756 A1* | 4/2015 | Li | H02K 9/04 290/55 |
| 2016/0084226 A1* | 3/2016 | Eriksen | F03D 15/20 290/55 |
| 2020/0003187 A1* | 1/2020 | Soerensen | H02K 9/18 |
| 2020/0095975 A1* | 3/2020 | Madani | F03D 9/25 |
| 2021/0079898 A1* | 3/2021 | Vcelka | F03D 80/88 |
| 2021/0284316 A1* | 9/2021 | Kuoppamaki | F03B 17/06 |

* cited by examiner

BACK-UP POWER SUPPLY FOR WIND TURBINES

The present disclosure relates to wind turbines, and more particularly relates to back-up power supplies for wind turbines. The present disclosure further relates to methods and systems using small wind turbines integrated in a nacelle of a large-scale wind turbine.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly or through a gearbox. This way, the generator produces electricity which can be supplied to the electrical grid.

The wind turbine hub may be rotatably coupled to a front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower that contains and protects e.g. the gearbox (if present) and the generator and, depending on the wind turbine, further components such as a power converter, and auxiliary systems.

A wind turbine may comprise a plurality of auxiliary systems that are dependent on a power supply for their functioning. Such auxiliary systems may include one or more pitch systems to rotate the blades along their longitudinal axes and may also include a yaw system to rotate the nacelle around a longitudinal axis of the tower so as to align the nacelle and wind turbine rotor with the incoming wind direction. Further auxiliary systems include communication devices (to communicate a status from a wind turbine to a control center), air conditioning systems, lights, lubrication pumps, beacons and many other.

When a wind turbine is operating and delivering electrical power to the grid, such auxiliary systems may receive power for their functioning from their connection to the electrical grid. For example, a main voltage transformer of a wind turbine may be connected to an electrical grid, e.g. the electrical grid of a wind farm. An auxiliary voltage transformer may be connected to step down a voltage of the power delivered from the grid for supplying to auxiliary systems.

It may happen during the lifetime of a wind turbine that a wind turbine is temporarily disconnected from the electrical grid. E.g. a wind turbine fault, or a grid fault may result in a situation wherein the wind turbine is disconnected from the grid. The wind turbine cannot deliver power to the grid, nor can the auxiliary systems receive power from the grid. It is known to provide back-up power supplies in order to deal with such situations. E.g. ultracaps, or batteries may be provided in order to make sure that at least the most vital auxiliary systems (e.g. beacons, communication systems, the wind turbine controller) can continue to work even if the wind turbine is disconnected from the grid for a longer period of time. It is also known to provide e.g. a diesel generator, or solar panels to provide back-up power supply to a wind turbine.

When a wind turbine can be connected to the electrical grid again, several systems need to be prepared, and require e.g. heating up prior to being able to start up again. The wind turbine may not necessarily be aligned with the prevailing wind direction at the time of starting. The yaw system of the wind turbine therefore may need to be activated prior to actual starting of the wind turbine.

Even if such back-up power supplies are provided, batteries and ultra-caps may not be sufficient to provide power e.g. during a week or two weeks of disconnection. Additional energy or power may be required for heating up prior to resuming operation. Even if it is feasible to provide back-up power supplies for longer periods of time, the cost involved may be prohibitive.

SUMMARY

In an aspect of the present disclosure, a wind turbine is provided. The wind turbine comprises a tower, a nacelle mounted on the tower, a wind turbine rotor with a plurality of blades, and a wind turbine generator operatively coupled with the wind turbine rotor. The wind turbine further comprises one or more auxiliary wind energy converters embedded in the nacelle.

According to this aspect, a wind turbine is provided which can provide electrical power to auxiliary systems of a wind turbine even when a wind turbine is disconnected from an electrical grid for a longer period of time. Auxiliary wind energy converters are embedded in the nacelle to generate the electrical power for such auxiliary systems. Therefore, if wind is available for start-up of the wind turbine, the same wind can be used to power auxiliary systems in preparation for starting up the wind turbine.

Embedded in the present disclosure is herein to be understood that the auxiliary wind energy converters, are arranged at least partially inside the nacelle or along a wall of the nacelle housing. The auxiliary wind energy converters may be at least partially covered, e.g. by a ceiling, cover or shroud of the nacelle and may thus be invisible from an outside of the nacelle.

In examples, the rotor plane of the auxiliary wind energy converters may be substantially parallel to a local part (ceiling or sidewalls) of the nacelle. I.e. the rotor plane may be substantially parallel to the part or portion of the nacelle where the auxiliary wind energy converter is arranged. E.g. for an auxiliary wind energy converter (or "smaller" wind turbine) arranged with a ceiling of the nacelle, the rotor plane may be substantially horizontal.

In a further aspect of the present disclosure, a method is provided, which comprises wind flowing within a shroud of a nacelle to provoke an air flow through one or more auxiliary wind energy converters arranged with the nacelle. The method further comprises converting mechanical energy of the auxiliary wind energy converter to electrical energy and providing at least a part of the electrical energy of the auxiliary wind energy converters to an auxiliary system of the wind turbine and/or to an energy storage element.

DETAILED DESCRIPTION OF EXAMPLES

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
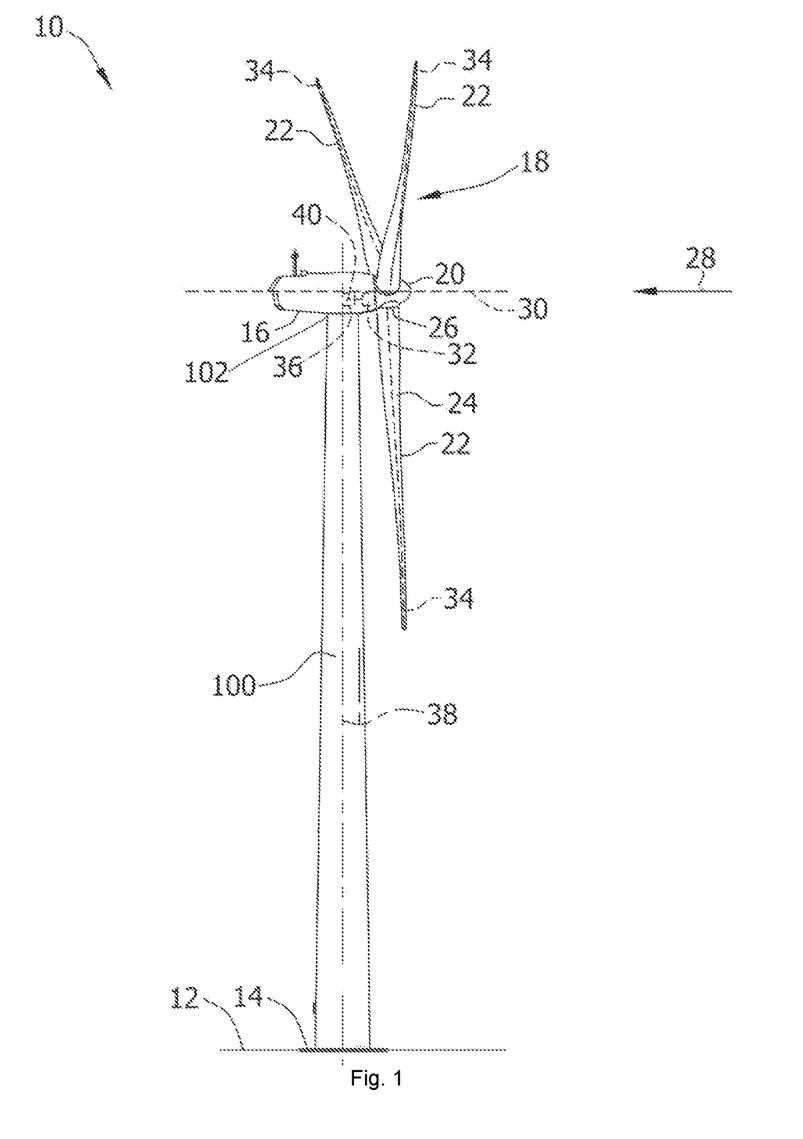
FIG. 1 schematically illustrates a perspective view of one example of a wind turbine.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 100 that extends from a support system 14 on a ground 12, a nacelle 16 mounted on tower 100, and a rotor 18 that is coupled to nacelle 16. FIG. 1 specifically depicts an onshore wind turbine, but the present disclosure also relates to offshore wind turbines.

The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 100 may be fabricated from tubular steel to define a cavity (not shown in FIG. 1) between a support system 14 and the nacelle 16 arranged at a top end 102 of tower 100. In an alternative embodiment, the tower 100 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
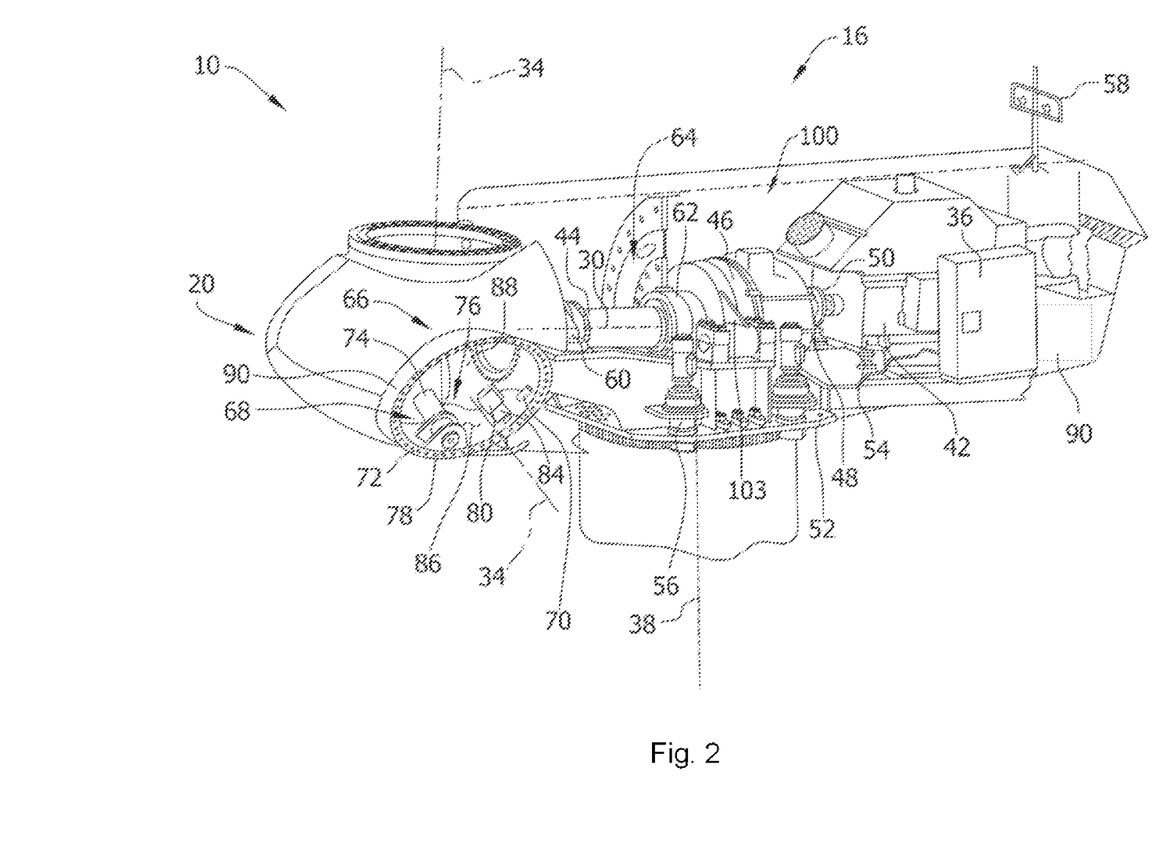
FIG. 2 illustrates a simplified, internal view of one example of the nacelle of the wind turbine of FIG. 1.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high speed shaft 48 by translating the relatively slow rotational movement of the rotor 18 and of the main shaft 44 into a relatively fast rotational movement of the high speed shaft 48. The latter is connected to the generator 42 for generating electrical energy with the help of a coupling 50. Furthermore, a transformer 90 and/or a suitable electronics, switches, and/or inverters may be arranged in the nacelle 16 in order to transform electrical energy generated by the generator 42 having a voltage between 400V to 1000 V into electrical energy having medium voltage (10-35 KV). Said electrical energy is conducted via power cables 160 from the nacelle 16 into the tower 100.

The gearbox 46, generator 42 in transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 100 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angel of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery, electric capacitors hence letter or an electrical generator driven by the rotation of the hub 20, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to outer surface.

Figure 3A:
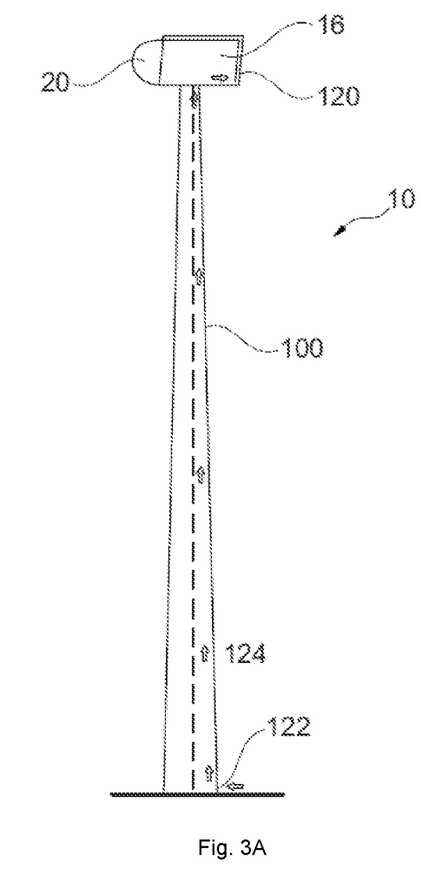
FIGS. 3A-3D schematically illustrate an example of a wind turbine including a plurality of auxiliary wind energy converters.
Figure 3B:
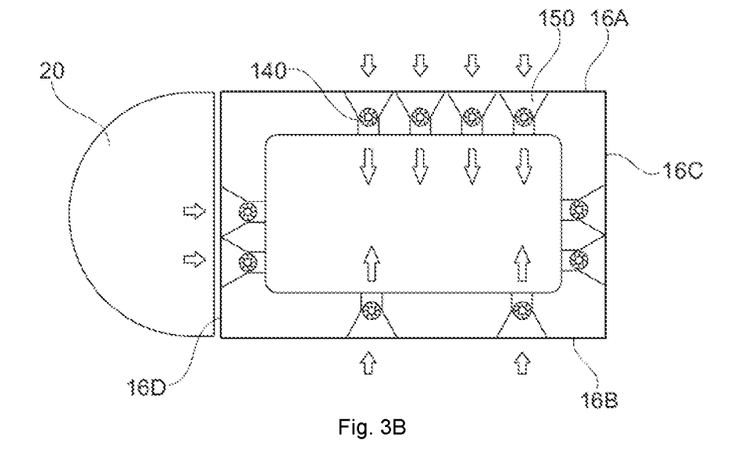
Figure 3C:
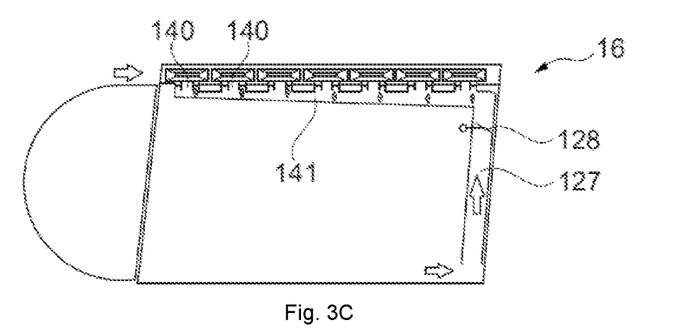
Figure 3D:
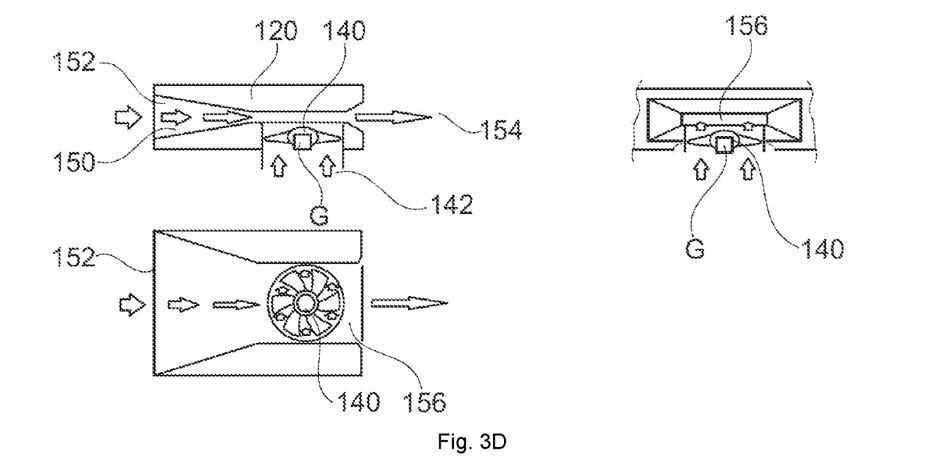

FIGS. 3A-3D schematically illustrate an example of a wind turbine including a plurality of auxiliary wind energy converters. FIG. 3A schematically illustrates an air conduit supplying air flow towards the wind energy converters. FIG. 3B illustrates a cross-section in top view near a top of the nacelle. FIG. 3C illustrates a plurality of auxiliary wind energy converters arranged near a top of the nacelle. FIG. 3D schematically illustrates a cross-sectional view in a longitudinal vertical plane (top left), a cross-sectional view in a transverse vertical plane (top right) and a cross-sectional top view. All examples of the present disclosure may be used both in offshore and onshore wind turbines and wind farms.

In an aspect of the present disclosure, a wind turbine 10 is provided which comprises a tower 100, a nacelle 16 mounted on the tower 100 and a wind turbine rotor 18 with a plurality of blades 22. The wind turbine further comprises a wind turbine generator 42 operatively coupled with the wind turbine rotor 18. The wind turbine 10 further comprises one or more auxiliary wind energy converters 140 arranged with the nacelle 16. The auxiliary wind energy converters 140 are shown embedded in the nacelle.

In this example, the auxiliary wind energy converters 140 may form part of the ceiling of the nacelle. The auxiliary wind energy converters 140 of this example may have a rotor plane that is substantially parallel to a part of the nacelle to which they are attached.

The wind turbine generator 42 may herein be regarded as the main generator of the wind turbine. The main generator is configured to convert mechanical energy of the wind turbine rotor to electrical energy. The electrical energy may be delivered to the electrical grid, e.g. through a power electronic converter and a main voltage transformer. The rotor 18 may be rotatably mounted with respect to (a frame arranged inside) the nacelle 16 (see e.g. FIG. 1).

The auxiliary wind energy converters 140 are also driven by an air flow and also comprise a rotor with blades or vanes in order to rotate when driven by an air flow. The auxiliary wind energy converters 140 are however much smaller than the wind turbine rotor. The auxiliary wind energy converters may be configured to drive a corresponding (auxiliary) generator. The electrical energy provided by the auxiliary generator is not destined to be delivered to the electrical grid. Rather electrical energy provided by the auxiliary generators may be provided to energy storage elements and also particularly to auxiliary systems. Such auxiliary systems may include heating systems, cooling systems, beacons, communication devices, pitch systems, a yaw system and other. The terms auxiliary wind energy converters and smaller wind turbines are herein used interchangeably.

In the example of FIG. 3, the auxiliary wind energy converters 140 are covered by a shroud 120 of a nacelle. A shroud may be formed by any type of suitable cover or covering. The nacelle in this respect may be regarded as having a double ceiling. A first ceiling of the nacelle closes off an inner housing of the nacelle. The second ceiling is formed by a shroud. In between the first and second ceiling, wind channels 150 may be arranged. In other examples, the nacelle may have a double sidewall, wherein wind channels 150 may be arranged between the two sidewalls.

In examples, one or more wind channels 150 may be provided between a shroud 120 and a remainder of the nacelle. In the example of FIG. 3, the wind channels 150 may have an entry 152 and an exit 154. The entry 152 may form an inlet for the wind channel with inwards gradually decreasing cross-section, i.e. the dimensions of the wind channel 150 decrease from an entry point towards a central portion 156 of the wind channel 150. The exit 154 may form an outlet of the wind channel with gradually increasing cross-section i.e. the dimensions of the wind channel with gradually increasing cross-section i.e. from a central portion 156 of the wind channel to an exit point.

In the example of FIG. 3, the auxiliary wind energy converters 140 are not directly driven by the wind flow through wind channel 150, although in other examples this may be the case. The varying cross-section of the wind channel means that when wind flows through the wind channel 150, the wind speed increases in the narrowest portion of the wind channel. The increase of wind speed means that due to Bernoulli's principle the static pressure in the narrow(est) portion of the wind channel is lower. The reduction in fluid pressure that results when a fluid flows through a constricted section (or choke) of a channel is also known as the Venturi effect.

The wind turbine 10 may include an air conduit 124, or air flow system extending from an inlet 122 to an outlet, or a plurality of outlets. The outlet(s) may be arranged at the nacelle. The inlet may be arranged with the tower of the wind turbine. In further examples, the inlet may be arranged at a different location of the wind turbine, e.g. at a different height of the tower, with or at the transition piece, with the nacelle or elsewhere. Between the inlet 122 and the outlet(s), one or more auxiliary wind energy converters 140 are arranged. In the example of FIG. 3, the auxiliary wind energy converters 140 are configured to be driven by an air flow from an inside of the nacelle towards an outside of the nacelle. As air flow throughs air conduit 124, it can provide cooling in different parts of the wind turbine.

Following the example of FIG. 3A, the air conduit may extend from a bottom of the wind turbine tower to the nacelle. The air conduit may further extend along a rear (downwind) end of the nacelle in vertical channel 127. In this example, a valve 128 may be arranged in the vertical channel 127 to control flow rate through the air conduit, and or a route through the air conduit. In other examples, the air conduit may be arranged along or in the vicinity of certain components which may require cooling, such as e.g. electric components.

In the depicted example, the air conduit then extends forward (to an upwind side of the nacelle) in a substantially horizontal part 141 of the air conduit. Along the substantially horizontal part 141, multiple entrances to auxiliary wind energy converters may be arranged.

As may be most readily seen in FIG. 3D, as wind flows through wind channel 150, a low pressure is created on one side of auxiliary wind energy converter 140 due to the Venturi effect mentioned before. An air flow from an entrance 142 to an exit of the converter 140 may be established. The air flow towards the entrance 142 may come from an inside of the wind turbine. The exit of the converter 140 may be formed by central portion 156 of wind channel 150.

The air flow, in this example, from an inside of the nacelle towards an outside of the nacelle may thus be caused by a Venturi effect. As air flows through the auxiliary wind energy converter 140, the converter is set into rotation. The auxiliary wind energy converter 140 may be operatively coupled to an auxiliary generator to convert the mechanical energy of the converter 140 to electrical energy.

Even though the air flow through the wind energy converter 140 may be mainly driven by the Venturi effect, an additional flow may be provided by a chimney effect of the wind turbine tower. An inlet of the air conduit 124 may be arranged at or near a bottom of the wind turbine to improve this chimney effect. The chimney effect is the movement of air into and out of buildings, chimneys, or towers, resulting from air buoyancy. Buoyancy may occur due to a difference in air density resulting from e.g. temperature and moisture differences.

In some examples, the air conduit may comprise one or more valves 128 to control the air flow in the air conduit, and particularly a route within the air conduit. A valve may herein be regarded as any element or device that regulates, directs or controls the flow of a fluid. One or more valves may be used to direct air to one or more of the auxiliary wind energy converters and away from other auxiliary wind energy converters. Bypassing some of the auxiliary converters or concentrating the air flow towards some of the auxiliary converters may e.g. depend on the wind conditions, and particularly on the prevailing incoming wind direction.

In examples, one or more of the auxiliary wind energy converters are arranged with a sidewall of the nacelle. With reference to FIG. 3B, one or more of the converters 140 may be arranged with a first sidewall 16A of the nacelle. Further converters 140 may be arranged with the opposite sidewall 16B of the nacelle. The number of converters arranged with each of the sidewalls 16A, 16B may be different or may be the same. Still with reference to FIG. 3B, one or more auxiliary wind energy converters 140 may be arranged near a back 16C (downstream end) of the nacelle. Also, one or more auxiliary wind energy converters 140 may be arranged near a front 16D (an upstream end) of the nacelle.

The auxiliary wind energy converters may form part of the sidewall(s) and/or ceiling of the nacelle.

Depending on the prevailing wind conditions, a selection of the auxiliary wind energy converters may be operational, whereas others are not.

Valves may also be used to prevent air flow in the channel. I.e. if it is deemed unnecessary for the auxiliary wind energy converters to be operated (e.g. when the wind turbine is connected normally to the grid), then their operation may be interrupted by closing one or more valves in the air flow channel.

Filters, or other purifying systems may be arranged at the inlet 122 or along the air channel 124.

With reference to FIG. 3C, one or more of the auxiliary wind energy converters may be arranged at or near a top of the nacelle. The nacelle 16 may form a housing that protects components such as the generator, power electronic converter, and gearbox (if present). The shroud 120 may be offset from the main housing of the nacelle to provide the wind flow between the shroud 120 and the main housing.

In examples, the auxiliary wind energy converters comprise an auxiliary generator, and an electronic converter connected to the auxiliary generator. The auxiliary generator may be embedded in the impeller of the auxiliary wind energy converters.

In alternative examples, the air flow driving the auxiliary wind energy converters is arranged from an entrance of the auxiliary wind energy converters to an exit of the auxiliary wind energy converters, wherein the entrance and the exit of the auxiliary wind energy converters are arranged outside the nacelle. That is, in these examples, the air flow driving the auxiliary wind energy converter(s) is not arranged from an inside of the wind turbine (and particularly the nacelle) to an outside of the wind turbine. In some of these examples, at least a part of the air flow may be recirculated from the exit of the auxiliary wind energy converters to the entrance.

In some examples, the auxiliary wind energy converters may be configured to be operated as a motor for driving an air flow. In a possible implementation, the auxiliary wind energy converters may be selectively driven as motors i.e. an auxiliary generator connected to an auxiliary wind energy converter may act as a motor to drive the auxiliary wind energy converter as fans. At times when no energy production is required from the auxiliary wind energy converters, and there is a need for cooling or augmented cooling in some parts of the wind turbine, an extra cooling air flow may be established by driving the auxiliary wind energy converters as fans. A control system may be provided to control the valves in the air conduit and to selectively drive the auxiliary wind energy converters. The air flow may be a combination of the aforementioned Venturi effect, chimney effect and suction provided by the auxiliary wind energy converters.

In an aspect of the present disclosure, a method for providing power to an auxiliary system of a wind turbine 10 is provided. The method comprises wind flowing within a shroud of a nacelle 16 to provoke an air flow through one or more auxiliary wind energy converters 140 arranged with the nacelle 16. The method further comprises converting mechanical energy of the auxiliary wind energy converters 140 to electrical energy and providing at least a part of the electrical energy of the auxiliary wind energy converters 140 to an auxiliary system of the wind turbine and/or to an energy storage element.

In examples, the air flow through the one or more auxiliary wind energy converters may be substantially perpendicular to the wind flow that provokes the air flow.

In examples, such a method may be carried out continuously, including during normal operation. In other examples, such a method may be carried out when a detection is made that the connection with the electrical grid is lost. E.g. a wind turbine controller, or a wind farm controller may make such a determination. In response to a disconnection from the grid, one or more of the auxiliary wind energy converters may become operational. For example, a wind turbine controller may control valves along the air channel within the wind turbine to open and allow air flow towards the corresponding auxiliary wind energy converters.

Figure 4:
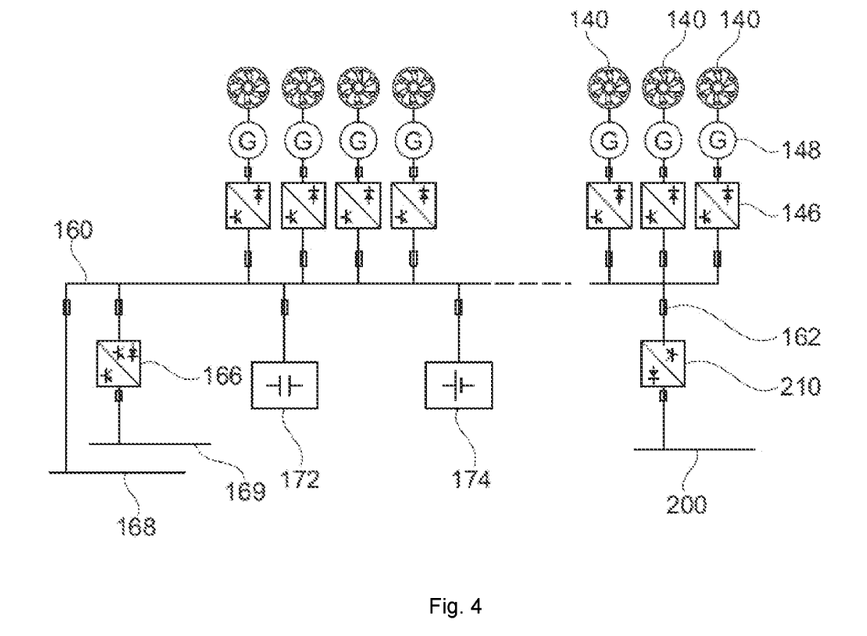
FIG. 4 schematically illustrates an example of how electrical power may be supplied to auxiliary systems of a wind turbine.

FIG. 4 schematically illustrates an example of how electrical power may be supplied to auxiliary systems of a wind turbine. FIG. 4 illustrates a plurality of auxiliary wind energy converters ("smaller wind turbines") 140. An auxiliary generator 148 is operatively connected with each of these smaller turbines. The auxiliary generator 148 may produce AC or DC power. A converter 146 may convert the AC or DC power delivered by the generators 148 to DC power to be delivered to DC bus 160.

In these examples, a single DC bus 160 may be common to all of the auxiliary wind energy converters 140. From the DC bus 160, a part of the electrical energy may be provided to auxiliary systems. Some of the auxiliary systems 169 may require AC power supply. A DC/AC inverter 166 may convert DC power from the DC bus 160 to AC power for the auxiliary systems 169. Some of the auxiliary systems 168 may require DC power, which may be delivered from the DC bus 160 directly.

In normal operation, power to the DC bus may be ensured from the electrical grid 200, which may be a wind farm grid. An AC/DC converter 210 may be arranged between the electrical grid 200 and DC bus 160.

In some examples, the method may comprise providing another part of the electrical energy of the auxiliary wind energy converters 140 to an energy storage element. As illustrated in FIG. 4, a wind turbine may include one or more ultracaps ("ultracapacitors") 172, and/or one or more batteries 174. The ultracaps 172 and batteries may form a back-up power supply for some of the auxiliary systems. When the connection with the electrical grid is lost, the ultracaps 172, batteries 174 or further energy storage elements may provide power to auxiliary systems at least for some time. With systems and methods as herein described, the amount of energy storage required to ensure continued operation of important auxiliary systems can be reduced due to a supply of energy from the auxiliary wind energy converters. As noted before, the supply of energy may be potentially continuous throughout operation and/or selective in case of disconnection from the grid.

When the auxiliary wind energy converters 140 are operational, part of the electrical power from the auxiliary wind energy converters 140 may be diverted to the energy storage elements.

As shown in FIG. 4, multiple protective elements (fuses, switches and other) may be arranged in the electrical circuit depicted in FIG. 4.

In a further aspect of the present disclosure, a wind turbine is provided, which comprises a nacelle arranged on top of a wind turbine tower, a wind turbine rotor with a plurality of blades operatively coupled to a main generator and one or more auxiliary systems. The wind turbine may further comprise a first auxiliary wind energy converter arranged with the nacelle, wherein the first auxiliary wind energy converter is operatively coupled with an auxiliary generator. The auxiliary generator is configured to provide electrical power to one or more of the auxiliary systems when the wind turbine is disconnected from an electrical grid.

In some examples, the smaller wind turbines may be configured to be driven by an air flow from an inside of the nacelle towards an outside of the nacelle.

In some examples, the air flow from an inside of the nacelle towards an outside of the nacelle may be caused by a Venturi effect of a wind flow within a shroud of the nacelle. In examples, an air flow channel may be provided between an inlet of the wind turbine, and an outlet at the nacelle, and wherein the inlet is arranged in the tower of the wind turbine.

In some examples, the wind turbine may further comprise batteries and/or ultracaps for providing electrical power to the auxiliary systems.

Within the scope of the present disclosure, the auxiliary wind energy converters may have a variety of shapes and sizes. In some examples, bidirectional Wells turbines may be used. In some examples, the auxiliary wind energy converters may be dependent on the Venturi effect. In other examples, the auxiliary wind energy converters may be directly driven by a wind flow. In examples, the rotor of the auxiliary wind energy converters may be e.g. 50 cm to 2 meter in diameter. In examples, the number of auxiliary wind energy converters may be between 2 and 20, and more specifically between 4 and 10. The rated power of the auxiliary wind energy converters will depend on the cross-sectional area of the converter, and on the nominal flow speed through the converter.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim and shall not be construed as limiting the scope of the claim.

The invention claimed is:

1. A wind turbine comprising:
   a tower;
   a nacelle mounted on the tower;
   a wind turbine rotor with a plurality of blades;
   a wind turbine generator operatively coupled with the wind turbine rotor;
   one or more auxiliary wind energy converters embedded in the nacelle; and
   wherein the auxiliary wind energy converters comprise an auxiliary generator.

2. The wind turbine of claim 1, wherein the auxiliary wind energy converters are covered by a shroud of the nacelle.

3. The wind turbine of claim 1, wherein the auxiliary wind energy converters are driven by an air flow generated by a Venturi effect.

4. The wind turbine of claim 3, comprising structure that directs the air flow from an inside of the nacelle to an outside of the nacelle.

5. The wind turbine of claim 4, wherein the structure comprises an air conduit between an inlet of the wind turbine and an outlet of the nacelle.

6. The wind turbine of claim 5, wherein the inlet is arranged in the tower.

7. The wind turbine of claim 5, wherein the air conduit comprises one or more valves to control the air flow.

8. The wind turbine of claim 3, wherein the air flow is directed from an entrance of the auxiliary wind energy converters to an exit of the auxiliary wind energy converters, wherein the entrance and the exit of the auxiliary wind energy converters are arranged outside the nacelle.

9. The wind turbine of claim 1, wherein one or more of the auxiliary wind energy converters are arranged at a top of the nacelle or with a sidewall of the nacelle.

10. The wind turbine of claim 1, wherein the auxiliary wind energy converters comprise an electronic converter connected to the auxiliary generator.

11. The wind turbine of claim 10, wherein the auxiliary generators are connected to a common DC bus.

12. The wind turbine of claim 1, further comprising one or more energy storage elements configured to receive electrical power from the auxiliary generators.

13. The wind turbine of claim 1, wherein the auxiliary wind energy converters are configured to be operated as a motor for driving an air flow.

14. A method comprising:
   directing a wind flow within a shroud of a nacelle to provoke an air flow through one or more auxiliary wind energy converters arranged with the nacelle;
   converting mechanical energy of the auxiliary wind energy converter to electrical energy; and
   providing at least a part of the electrical energy of the auxiliary wind energy converters to an auxiliary system of the wind turbine or to an energy storage element.

15. The method of claim 14, further comprising controlling the air flow through an air channel within a wind turbine tower to the auxiliary wind energy converters.

16. A wind turbine comprising a nacelle arranged on top of a wind turbine tower;
   a wind turbine rotor with a plurality of blades, the wind turbine rotor operatively coupled to a main generator;
   one or more auxiliary systems;
   a first auxiliary wind energy converter arranged with a first portion of the nacelle, wherein the first auxiliary wind energy converter is operatively coupled with an auxiliary generator, and has a rotor plane substantially parallel to the first portion of the nacelle; and
   wherein the auxiliary generator is configured to provide electrical power to one or more of the auxiliary systems when the wind turbine is disconnected from an electrical grid.

17. The wind turbine of claim 16, wherein the first auxiliary wind energy converter is configured to be driven by an air flow from an inside of the nacelle towards an outside of the nacelle.

18. The wind turbine of claim 17, wherein the air flow from an inside of the nacelle towards an outside of the nacelle is caused by a Venturi effect of a wind flow within a shroud of the nacelle.

19. The wind turbine of claim 18, wherein an air flow channel is provided between an inlet of the wind turbine, and an outlet at the nacelle, and wherein the inlet is arranged in the wind turbine tower.

20. The wind turbine of claim 16, further comprising batteries or ultracapacitors that provide electrical power to the auxiliary systems.

* * * * *